United States Patent [19]

Preiss, II et al.

[11] Patent Number: 6,031,503
[45] Date of Patent: *Feb. 29, 2000

[54] POLARIZATION DIVERSE ANTENNA FOR PORTABLE COMMUNICATION DEVICES

[75] Inventors: Joseph A. Preiss, II, Westford; Terry L. McElroy, Hudson; Arnold E. Van Doren, Sterling; Stephen R. Donaldson, Lincoln; Fernando Beltran, Framingham, all of Mass.

[73] Assignee: Raytheon Company, Lexington, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/803,478

[22] Filed: Feb. 20, 1997

[51] Int. Cl.[7] .............................. H01Q 13/10; H01Q 1/24
[52] U.S. Cl. ........................ 343/770; 343/767; 343/702
[58] Field of Search ..................... 343/770, 767, 343/702, 700 MS, 725, 795, 794, 727, 729, 730, 846; H01Q 13/10, 1/24

[56] References Cited

U.S. PATENT DOCUMENTS

| | | | |
|---|---|---|---|
| 4,438,437 | 3/1984 | Burgmyer | 343/770 |
| 4,771,291 | 9/1988 | Lo et al. | 343/700 MS |
| 4,975,711 | 12/1990 | Lee | 343/702 |
| 5,486,836 | 1/1996 | Kuffner et al. | 343/700 MS |
| 5,677,698 | 10/1997 | Snowdon | 343/702 |

FOREIGN PATENT DOCUMENTS

| | | | |
|---|---|---|---|
| 0623967 A1 | 5/1993 | European Pat. Off. | H01Q 1/36 |
| 0610025 A1 | 2/1994 | European Pat. Off. | H05K 5/02 |
| 2292482 | 8/1994 | United Kingdom | H01Q 1/22 |

OTHER PUBLICATIONS

IBM Technical Disclosure Bulletin; vol. 37 No. 08, Aug. 1994.

*Primary Examiner*—Hoanganh Le

[57] ABSTRACT

A communications card having an antenna assembly providing polarization diversity for use with a portable computer is provided. The antenna assembly comprises two folded antennas, which may be dipoles or slot radiators, that are disposed orthogonally to one another to provide polarization diversity. Signals are carried to and from the antenna by microstrip feed lines. The microstrip lines are placed off center along each antenna slot to establish an acceptable impedance match for the antenna. The feed lines are coupled to the communications card by way of coaxial cables. The antenna assembly is coupled with the communications card in a hinged arrangement thus allowing for spatial redirection of the antenna, if desired.

15 Claims, 3 Drawing Sheets

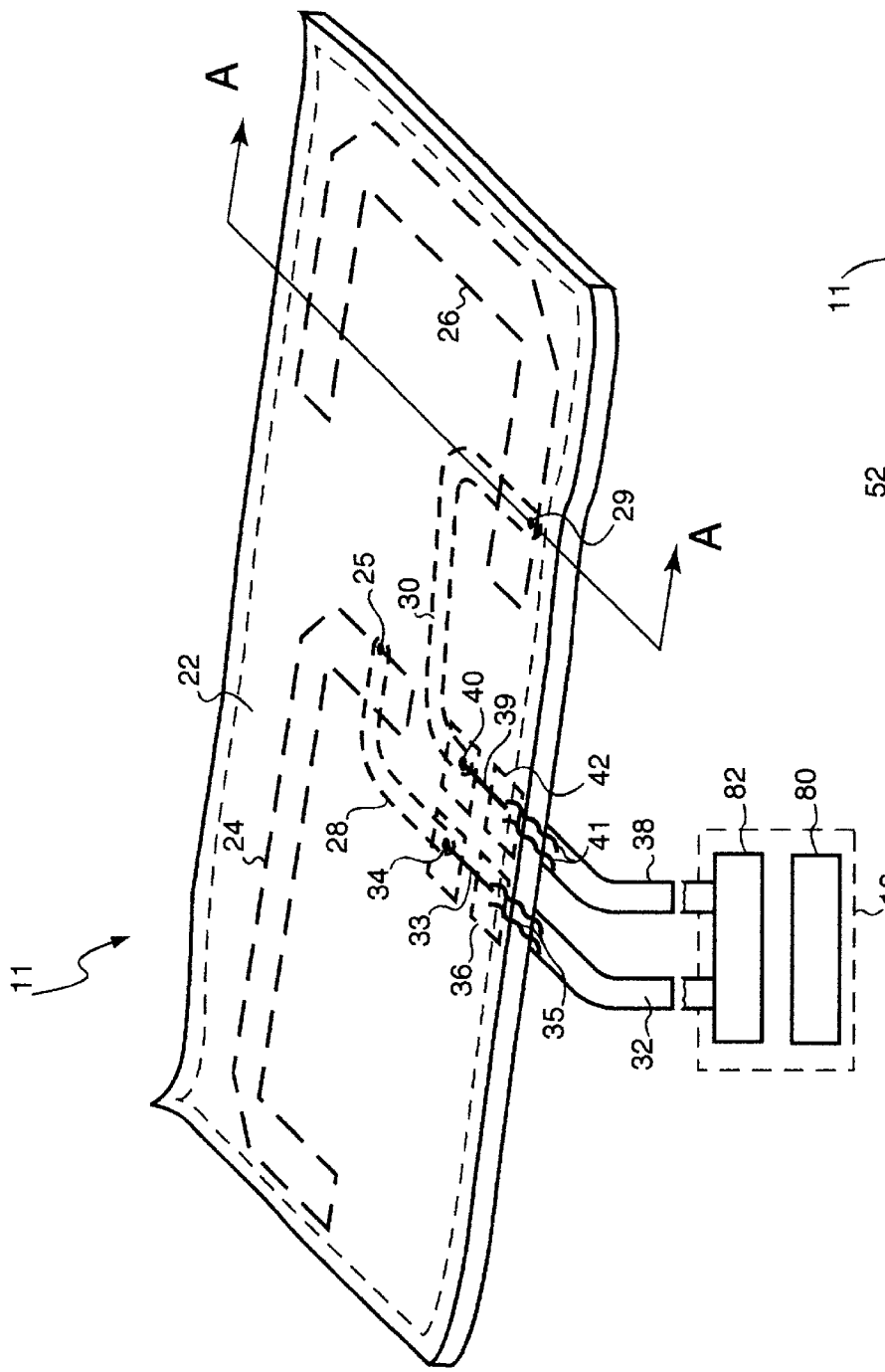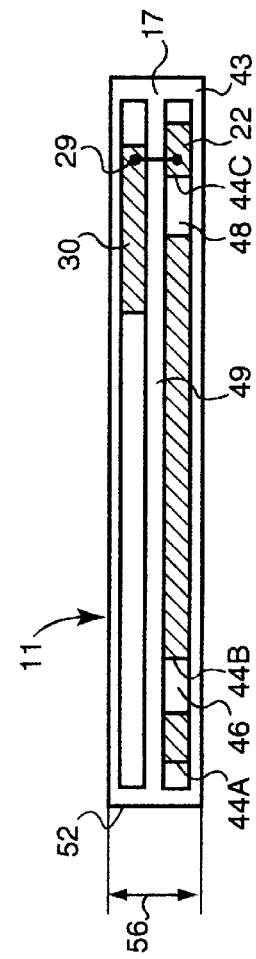

POLARIZATION DIVERSE ANTENNA FOR PORTABLE COMMUNICATION DEVICES

FIELD OF THE INVENTION

This invention relates generally to an antenna assembly and, more specifically, it relates to a polarization diverse antenna assembly for use with small communication devices such as laptop computers.

BACKGROUND OF THE INVENTION

The development of wireless local area networks ("WLAN") for computers has facilitated the use of portable devices such as laptop computers for network communication. Such computers are small by design and, thus, present space constraints for communication units associated with them. For example, laptop computers are provided with slots in which accessory cards can be inserted. These slots and the associated circuitry generally have a prescribed standard configuration such as the PCMCIA standard. A communication device used with such a computer must conform to this standard.

Typically, a PCMCIA card used for wireless communications has been fitted with a transceiver and an antenna for communication by the computer. However, these cards have not been completely effective because portable computers are often used in complex radio frequency ("RF") environments such as office buildings and the like, where WLAN's are usually installed. These environments include physical barriers which give rise to multiple reflections of the signals transmitted or received by the computer. The signals travel over multiple paths, resulting in interference patterns and thus "dead spots". The radio frequency environment is further complicated by movement of persons or equipment within the environment. Additionally, the portable computers will be moved from location to location, thus changing the radio frequency environments in which they are to be operated.

It has been proposed to address these problems by using a tethered antenna which can be moved by the user to a position where signal strength is sufficient. Such tethered designs, however, present an inconvenience in that the tether requires the user to continually set up the antenna when moving the portable device to a different location. They can also give rise to mechanical stress, and resulting failure, of the wires used in the tether.

Another proposed solution is the use of multiple antennas to provide spatial diversity, so that if one of the antennas is in a dead spot, the other one is likely to encounter a usable signal. However, spatial diversity has not provided sufficient immunity to fading and, thus, such solutions have not been effective.

There remains a need for a low cost, more reliable antenna assembly which conforms to the available space in a portable communication device, the antenna of which allows maximum signal propagation while experiencing minimal fading in a dynamic RF environment.

SUMMARY OF THE INVENTION

The antenna assembly embodying the present invention includes a polarization diverse antenna incorporating two half-wavelength antennas encased in a plastic housing. The housing readily conforms to a communications card for use with a portable laptop computer. Specifically, one embodiment of the antenna assembly is designed for use with a transceiver incorporated into a PCMCIA communications card that fits within the appropriate card slot in a portable computer.

In its preferred form, the antenna assembly is configured to provide a pair of slot radiators. These antennas are preferably disposed at right angles to one another such that radiation by the respective antennas is orthogonally polarized. The slot radiators are folded so as to be compatible with the dimensions of a PCMCIA card. The card carries the appropriate electronics for the transceiver, i.e. the receiver and transmitter electronics.

Each antenna is coupled to the transceiver electronics by way of a microstrip feed line. More specifically, one portion of the microstrip line is passed across the slot at a selected feed point off the center of that slot. The other end of the microstrip line is connected from the slot radiator to the transceiver electronics by a flexible coaxial cable.

In operation, if a signal is of a polarization such that it is cross-polarized with one of the slot radiators, it will not be cross-polarized with respect to the other slot radiator because of the polarization diversity of the antennas. Thus, at least one of the slot radiators will typically carry a usable signal. Moreover, the user can adjust the orientation of the antenna by rotating the antenna assembly about a hinge that connects the assembly to the communications card.

Preferably, a switch automatically controls the selection of the antenna to be used, depending upon the signal received from each. As will be understood by those skilled in the art, the signal will be chosen based upon a predetermined parameter such as signal-to-noise ratio.

The antenna assembly provides a low cost, simply made antenna for use in a complex RF environment.

BRIEF DESCRIPTION OF THE DRAWINGS

The invention description below refers to the accompanying drawings, of which:

FIG. 2 is an isometric view of the antenna assembly of FIG. 1 with two, orthogonally placed slot radiators with microstrip feed lines depicted in phantom.

FIG. 3 is a cross section of the antenna assembly taken along line A—A of FIG. 2.

DETAILED DESCRIPTION OF AN ILLUSTRATIVE EMBODIMENT

Figure 1:
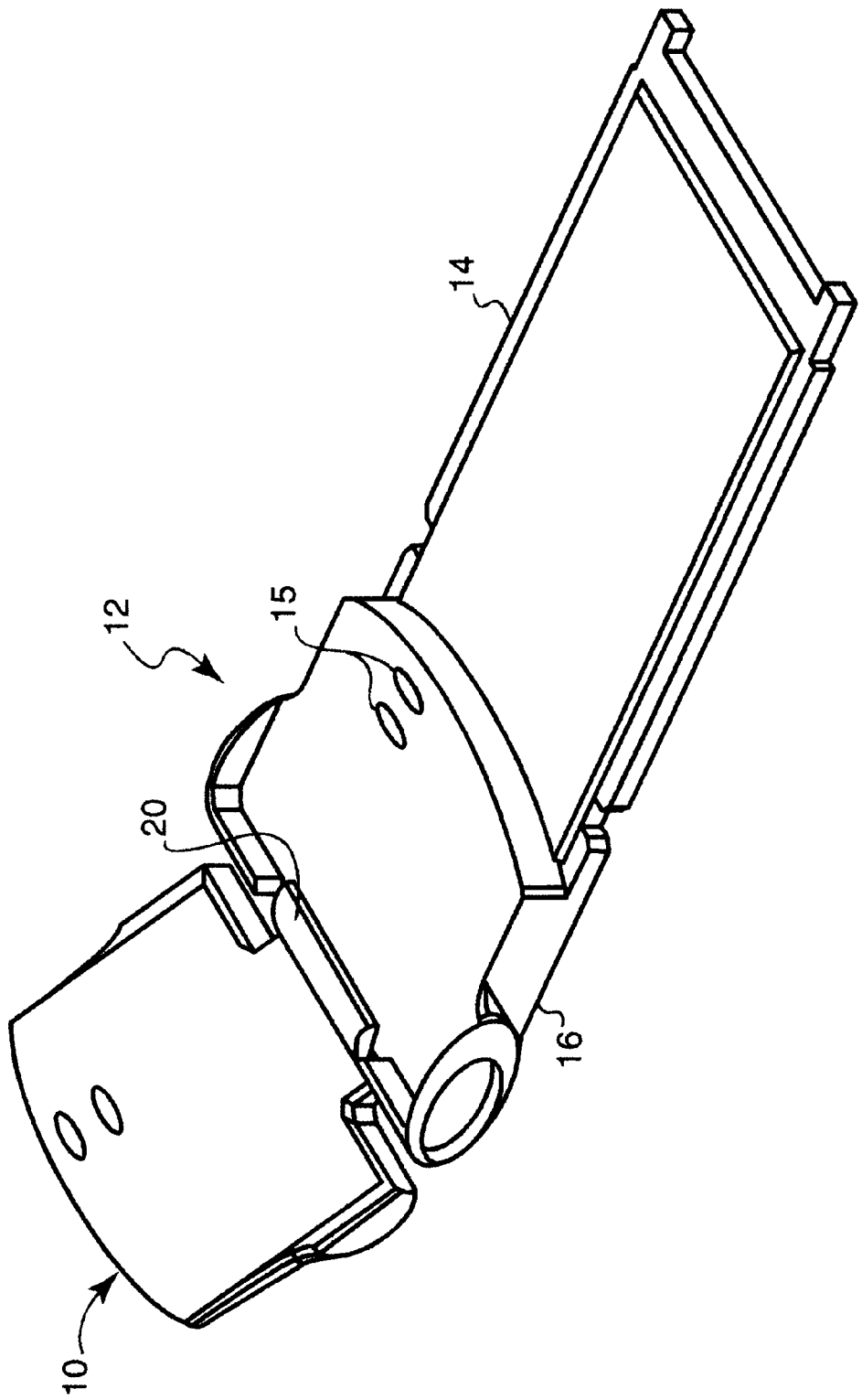
FIG. 1 is an isometric view of an antenna assembly embodying the invention with the antenna attached to a communications card.

As shown in FIG. 1, an antenna housing 10, which includes an antenna assembly 11 (FIG. 2) embodying the invention, is incorporated into a communications card 12 used with a portable laptop computer (not shown). The card 12 is constructed in such a manner as to conform to the PCMCIA standard. It includes a digital electronics portion 14 which is connected to a bus in the computer. The card 12 also includes an RF electronics section 16 containing a suitable transceiver (not shown). The user may be a member of a local area network, which is a collection of computers that use a consistent protocol to communicate with one another. By means of the transceiver and the antenna assembly 11, the user can communicate as a node on the network, either directly with another laptop computer which has wireless capability, or by way of a common access point to the network, even if the user is not in a fixed location.

The antenna housing 10 is physically joined to RF electronics section 16 by means of a hinge 20. The hinge allows for rotation of the antenna housing 10 about the horizontal. This facilitates orientation adjustment of the antenna assembly, in addition to the polarization diversity described herein. In operation, the antenna housing 10 is placed nominally to a vertical position and, thereafter, is rotated to provide an adjustment, as needed, in the particular RF environment. Suitable lights, such as LED's 15, can be provided to indicate that a usable signal has been obtained. When not in use, antenna housing 10 can be folded flat against the card body 12 for storage.

Referring to FIGS. 2 and 3, the antenna assembly 11 is configured according to typical printed circuit board techniques in which two copper sheets, which are adhered to either side of a plastic substrate 17, are etched to provide the desired conductor configurations. Thus, in the antenna assembly 11, the upper metal sheet has been etched to form two microstrip feedlines 28 and 30. The lower copper sheet has been etched to provide a ground plane conductor 22 containing two apertures which form folded antennas. Specifically, the conductor 22 includes a slot radiator 24 and an orthogonally-disposed slot radiator 26. The polarization of the slot radiator 24 is thus orthogonal to that of the slot radiator 26. The slot radiators 24 and 26 are preferably configured in a folded arrangement to be compatible with the PCMCIA card dimensions as discussed herein.

As shown in FIGS. 2 and 3, the feed line 28 passes across the slot radiator 24 and is connected by plated through-hole 25 to the conductor 22 at the edge of the radiator. The feed line 30 passes across radiator 26 and is connected to the conductor 22, at the edge of the plated through-hole 29.

The feed lines 28 and 30, in turn, are connected to the RF section 16 (FIG. 1) with two flexible coaxial cables 32 and 38, respectively. More specifically, the coaxial cable 32 has a center conductor 33 which is soldered to the microstrip feed line 28 at a pad 34. The cable 32 also has an outer conductor 35 which is soldered to a ground pad 36, as shown in FIG. 2. The ground pad 36 is connected through to conductor 22 to complete the circuit for the slot radiator 24.

Similarly, the coaxial cable 38 has a center conductor 39 connected to the microstrip feed line 30 at a pad 40. The outer conductor 41 is connected to a ground pad 42 which connects to conductor 22 to complete the circuit for the slot radiator 26.

The entire antenna assembly 11 is encapsulated within a plastic casing. In the encapsulation step, the antenna assembly 11 is made to conform to a curvature in the antenna housing 10 (FIG. 1). The coaxial cables 32 and 38 pass through the hinge 20 (FIG. 1),which connects antenna housing 10 to card 12 for convenience and protection of the cables.

A signal which is received or transmitted by the slot radiator 24 will be carried by the microstrip feed line 28 and cable 32 to the transceiver portion 80 of RF section 16. Similarly, a signal transmitted or received by the slot radiator 26 will be carried by the microstrip feed line 30 and cable 38 to transceiver portion 80. The switch 82 is contained within the transceiver portion 80, which is coupled with each of the microstrip feed lines 28 and 30. The switch 82 includes conventional electronics for comparing the signal-to-noise ratio of the signal received by each slot radiator and for selecting the antenna providing the better quality. The selected antenna is then used for both transmission and reception.

Figure 4:
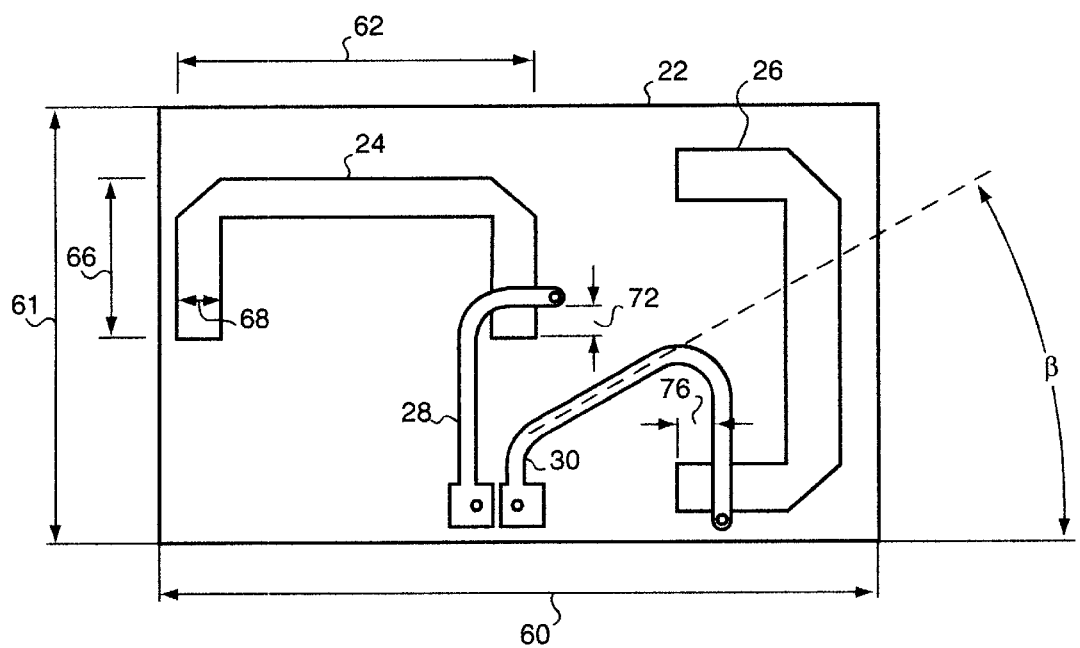
FIG. 4 is a schematic illustration of the ground plane conductor of the antenna assembly of the present invention, and depicting the microstrip feed lines associated with each slot.

Referring to FIG. 4, each of the radiators 24 and 26 has an electrical length of one-half wave-length. The physical dimensions of the slot radiators are selected based upon the materials utilized.

In a typical embodiment of the invention for operation in the frequency range of 2.40 to 2.48 GHz, the ground plane conductor 22 has one side 60 (FIG. 4) with a length of 1.950 inches and a second side 61 with a length of 1.2 inches. The slot radiator 24 has a longer dimension indicated by reference character 62 of 1.0 inch, and a shorter dimension 66 of 0.435 inches. The width of the radiator 24, which is indicated by the dimension 68, in FIG. 4 is 0.100 inches. The slot radiator 26 has the same dimensions as the slot radiator 24.

Ordinarily, a half wave antenna is fed at the center; however, in order to match the impedance of the coaxial cables 32 and 38, the microstrip feed line 28 is offset from the center of the slot radiator 24 by an amount that provides the desired impedance match for the antenna. In the example, the distance from the end of slot radiator 24 (72) in FIG. 4 will be 0.185 inches. The microstrip feed line 28 has an overall length of 0.75 inches. The microstrip feed line 30 is similarly offset from the center of the slot radiator 26. The distance from the end of the slot radiator 26 (76) in FIG. 4 will be 0.090 inches. Microstrip feed line 30 has an overall length of one inch. It is formed along the conductor 22 such that the arc of angle B shown in FIG. 4 is 30°. The feed line is constructed to have a characteristic impedance that matches that of the coaxial cable. In this embodiment, the physical dimensions set forth above provide an acceptable impedance match over an operating frequency range of about 2.40 to 2.48 gigahertz (GHz) for each of the antennas 24 and 26.

A test performed on this embodiment showed a low input return loss for each of the two slot radiators 24 and 26. In addition, measured results showed that the antennas achieved better than a 2:1 VSWR (voltage standing wave ratio) and more than 20 dB isolation between the radiators over the operating frequency range of 2.40 to 2.48 GHz. Measurements of the antenna radiation pattern for each slot were also conducted. The antenna pattern exhibits the classic dipole antenna pattern, but with a null axis orthogonal to the length of the slot. Some skewing of the radiation pattern was attributed to curvature in the plastic housing in which the antenna is embedded.

In operation, the user will typically set the antenna housing 10 to a vertical position. If an acceptable signal is not obtained, the antenna housing 10 can be rotated until an indicator light 15 (FIG. 1) shows that a signal of sufficient quality is obtained.

It should be understood that an antenna assembly embodying the invention can include dipoles instead of slot radiators, if desired in a particular application.

The antenna assembly provides a low-cost, polarization diverse antenna assembly which maintains WLAN system performance in complex electromagnetic environments such as office buildings. The assembly is adapted to be an integral feature of a WLAN card which maintains portability and compatibility with the PCMCIA standard. The hinged arrangement provides additional adjustment capability for the antenna assembly.

The terms and expressions employed herein are used as terms of description and not of limitation and there is no intention in the use of such terms and expressions, of excluding any equivalents or the features shown and described or portions thereof, but it is recognized that various modifications are possible within the scope of the invention claimed.

What is claimed is:

1. A communications card for transmission and reception of microwave signals with an associated portable computer, the communications card comprising:

(A) a transceiver portion including receiver and transmitter electronics for communication of said signals to and from said computer;

(B) a polarization diverse antenna assembly having:
1) a first antenna and an orthogonally-disposed second antenna with each antenna being substantially omni-directional about a first axis;
2) a single metal sheet adhered to a plastic substrate, said metal sheet comprising a ground plane conductor, and the first and second antennas being first and second slot radiators formed in said metal sheet, said slot radiators being unobstructed on both sides so that signals may be radiated and received from both sides of said ground plane conductor;

(C) a card body sized for insertion into a card slot in the portable computer, said card body having an RF section including said transceiver portion, and a digital electronics portion which provides a connection to the computer, and said antenna assembly being attached to said RF section of said card body in a hinge arrangement, whereby the radiation pattern of said antenna assembly is adjustable for obtaining maximum signal quality by rotation of said antenna assembly about said hinge arrangement;

(D) coupling means disposed between said transceiver portion and said antenna assembly for communicating signals between said transceiver portion and said antenna assembly.

2. The communications card of claim 1 wherein said transceiver portion includes a switch for selecting between signals received from said first antenna and said second antenna based upon the signal-to-noise ratio of the signal so produced by each of said first and second antennas.

3. The communications card of claim 1 wherein said coupling means includes a first microstrip feed line coupled at one end to said transceiver portion and connected at an other end across said first slot radiator, and a second microstrip feed line coupled at one end to said transceiver portion and connected at an other end across said second slot radiator.

4. The communications card of claim 3 wherein said first and said second microstrip feed lines are offset from a center of each of said first and second slot radiators, respectively, by a predetermined amount to set the impedance characteristic of said antenna assembly.

5. The communications card of claim 3 wherein said coupling means includes a first and second coaxial cable connected from said first and second microstrip feed lines, respectively, of said antenna assembly, to said transceiver portion.

6. The communications card of claim 5 wherein:

said first coaxial cable has an outer conductor connected to a first ground pad disposed on said ground plane conductor, and a center conductor connected to said one end of said first microstrip feed line, and said second coaxial cable has an outer conductor connected to a second ground pad disposed on said ground plane conductor, and a center conductor connected to said one end of said second microstrip feed line.

7. The communications card of claim 5 wherein said first and second coaxial cables are housed within said hinge arrangement.

8. The communications card of claim 1 wherein said antenna assembly is encapsulated in a plastic housing, said plastic housing being attached to said RF section of said card body.

9. The communications card of claim 8 wherein said plastic housing is sized to conform to said card body in such a manner that it can be folded flush against said card body for storage when not in use.

10. The communications card of claim 9 wherein said ground plane conductor is sized to fit within said plastic housing and said first and second slot radiators are C-shaped, folded slot radiators dimensioned to conform to said ground plane conductor.

11. The communications card of claim 10 wherein said computer is a PCMCIA portable computer and said card body is dimensioned to conform to said card slot associated with said portable computer.

12. A polarization diverse antenna assembly for use with a computer device, for the transmission and reception of microwave communications with a transceiver associated with the computer, the antenna assembly comprising:

(A) a first antenna and an orthogonally-disposed second antenna with each antenna being substantially omnidirectional about a first axis;

(B) a single metal sheet adhered to a plastic substrate, said metal sheet comprising a ground plane conductor, and the first and second antennas being first and second slot radiators formed in said metal sheet, said slot radiators being unobstructed on both sides so that signals may be radiated and received from both sides of said ground plane conductor;

(C) coupling means disposed between said transceiver and said first and second antennas for communicating signals between said transceiver and said first and second antennas; and (D) hinge arrangement connecting said antenna assembly to said transceiver portion in such manner that the spatial direction of said antenna assembly is adjustable by rotation of said antenna assembly about said hinge arrangement for obtaining maximum signal quality.

13. The antenna assembly of claim 12 wherein said first and second slot radiators are C-shaped, folded slot radiators dimensioned to conform to said ground plane conductor.

14. The antenna assembly of claim 12 wherein said coupling means includes a first microstrip feed line coupled at one end to said transceiver portion and connected at an other end across said first slot radiator, and a second microstrip feed line coupled at one end to said transceiver portion and connected at an other end across said second slot radiator, and said first and second microstrip feed lines are offset from a center of each of said first and second slot radiators, respectively, by a predetermined amount to set the impedance characteristics of said antenna assembly.

15. The antenna assembly of claim 14 further comprising a card body sized for insertion in to a card slot in said computer device, said card body having an RF section including said transceiver, and a digital electronics portion which provides a connection to said associated computer device, and said ground plane conductor including said first and second antennas is encapsulated in a plastic housing, said plastic housing being attached to said RF section of said card body.

* * * * *